US005172597A

United States Patent [19]
Hedeen

[11] Patent Number: 5,172,597
[45] Date of Patent: Dec. 22, 1992

[54] METHOD AND APPLICATION FOR MEASURING SOUND POWER EMITTED BY A SOURCE IN A BACKGROUND OF AMBIENT NOISE

[75] Inventor: Robert A. Hedeen, Clifton Park, N.Y.

[73] Assignee: General Electric Company, Schenectady, N.Y.

[21] Appl. No.: 612,937

[22] Filed: Nov. 14, 1990

[51] Int. Cl.[5] .......................................... G01N 29/24
[52] U.S. Cl. ...................................... 73/646; 73/602; 73/641
[58] Field of Search ................. 73/645, 646, 585, 602, 73/641

[56] References Cited

U.S. PATENT DOCUMENTS

| | | | |
|---|---|---|---|
| 3,176,263 | 3/1965 | Douglas | 73/646 |
| 3,827,288 | 8/1974 | Fletcher et al. | 73/584 |
| 4,236,040 | 11/1980 | Chung | 179/1 MN |
| 4,507,967 | 4/1985 | Schliekelmann | 73/641 |
| 4,532,807 | 8/1985 | Tomita et al. | 73/602 |
| 4,604,697 | 8/1986 | Luthra et al. | 73/602 |

FOREIGN PATENT DOCUMENTS 0158525  9/1982  Japan .................................. 73/645

OTHER PUBLICATIONS

G. Ebbit, Journal of Acoustic Soc. Am. Suppl. 1, vol. 84, S29, Fall 1988, Second Joint Meeting: Acoustical Societies of America and Japan, abstract L8 of a talk presented on Nov. 15, 1988 entitled, Compensation for Phase Mismatch in Sound Intensity Measurements.

U. D. Kietschi and J. S. Bolton, Journal of Acoustic Soc. Am, Suppl. 1, vol. 84, S32, Fall 1988, Second Joint Meeting: Acoustical Societies of America and Japan, abstract M4 of a talk presented on Nov. 15, 1988 entitled, The Use of Intensity Techniques for Noise Source Identification in Small Machinery.

R. Hickling, Journal of Acoustic Soc. Am. 87(3) Mar. 1990, 1182–1191, Narrowband indoor measurement of the second power of a complex mechanical noise source.

J. Y. Chung, Journal of Acoustic Soc. Am. 64(6), Dec. 1978, 1613–1616, Cross-spectral method of measuring acoustic intensity without error caused by instrument phase mismatch.

G. Krishnappa, Journal of Acoustic Soc. Am 69(1), Jan. 1981, 307–309, Cross-spectral method of measuring acoustic intensity by correcting phase and gain mismatch errors by microphone calibration.

F. J. Fahy, Sound Intensity, 1989, Elsevier Science Publisher, Ltd.

Sound Intensity, a booklet by Bruel & Kjaer, 2850 Naerum, Denmark.

Primary Examiner—Hezron E. Williams
Assistant Examiner—Rose M. Finley
Attorney, Agent, or Firm—Patrick R. Scanlon; James C. Davis, Jr.; Paul R. Webb, II

[57] ABSTRACT

The detection of sound emitted from a source in a dynamic environment of ambient background noise employs a sufficiently distributed array of sound intensity probes enclosing a sound source is adapted to collect measurements over the same time interval in a non-specific acoustic environment. Each probe in the array is comprised of a pair of mutually spaced microphones generally unmatched in their gain and phase response. A multi-channel fourier spectrum analyzer is used to provide a direct signal processing determination of sound intensity at each probe from pressure measurements taken at each microphone. Their computation is corrected to compensate for gain and phase mismatch between each microphone pair using independently derived probe calibration factors. These correction factors are linearly applied to the sound intensity determination at each probe of the array. Based on the geometry of the probe array and the sound intensity computed at each probe; an approximation of the net flow of emitted sound power through the closed surface of the probe array is made. This closed surface integral approach to determining the net flow of sound power effectively averages out any contribution due to ambient background noise, retaining only the total sound power emitted by the source exclusive of background noise.

8 Claims, 5 Drawing Sheets

METHOD AND APPLICATION FOR MEASURING SOUND POWER EMITTED BY A SOURCE IN A BACKGROUND OF AMBIENT NOISE

RELATED APPLICATIONS

This application is related to copending patent application Ser. No. 07/612,936, filed Nov. 14, 1990 filed concurrently herewith and assigned to the same assignee as the present application.

BACKGROUND OF THE INVENTION

The present invention relates to a method and apparatus for quantifying sound emanating from a product in a production line setting as a quality assurance check; and more particularly, for measuring sound intensity in order to determine the sound power emitted by a source in a dynamic environment of ambient background noise.

In practice, sound emission testing of certain products must be accomplished to assure quality control or verify noise specification standards for these products. For example, motors intended for use in aircraft cockpits, where cabin noise levels are strictly controlled, must meet strict acoustic specifications. It is also extremely desirable to measure the sound emanating from mechanical devices in operation, such as transmissions, compressors, etc. as a post-production quality assurance test to detect excessive vibration indicative of manufacturing defects. Catching such defects before products enter service avoids expensive recall programs and adverse customer reactions.

Problems faced by artisans in the sound measurement art include being able to quickly and conveniently evaluate sound sources in a production setting where masking levels of background noise are typically present. The ambient sound field, the region into which sound emanates, is affected by the propagation of extraneous sound i.e. noise, as well as, the presence or absence of reverberation, reflection and scattering. Sound testing without unacceptable loss of accuracy usually requires that each product be taken into an anechoic test chamber or other well defined acoustic space to control all but source contributions to the sound field. However, this limits the speed at which products can be tested. Prior emphasis in the sound detection art has been to control the ambient sound field, i.e. eliminate background noise rather than compensate for the existence of a noisy environment.

Heretofore, artisans have recognized but ineffectively utilized a noise compensating technique based on the direct measurement of sound intensity using a matched two microphone probe. The technique is based on the principle of conservation of sound field energy, which provides a general theoretical basis underlying a total sound power approach to characterizing a sound source exclusive of background noise.

The sound power W, representing the rate of transmitted sound energy, is mathematically expressed as the following closed surface integral of sound intensity flux:

$$W = \oiint_A \vec{I} \cdot \vec{dA} \quad (1)$$

where $\vec{I}$ is the instantaneous vector sound intensity indicative of the instantaneous rate of sound energy flowing through an arbitrary closed surface, A, enclosing a sound source; and $\vec{dA}$ is a differential surface vector directed outwardly normal to surface A. In short, equation (1) states that the flux of sound energy into closed surface A is equal to the flux of sound energy out of closed surface A for all sound originating outside the closed surface A. Performing the integral, "averages out" all vector sound intensity contributions due to those sources not enclosed by surface A. The integrated sound power inherently characterizes only those sources enclosed by surface A.

It is well known that an expression for instantaneous acoustic intensity, $\vec{I}$ can be derived in the frequency domain dependent only upon the Fourier transforms of pressures as measured using a two microphone technique. The reader is referred to U.S. Pat. No. 4,532,807 entitled "Method and Apparatus for Detecting Sound Source" by Tomita et al. which is incorporated by reference herein. This patent provides the details of such a derivation. This well known expression for the magnitude of the sound intensity vector, $\vec{I}$ (f), in the frequency domain at a position midway between two microphones, A and B, is given as follows:

$$\vec{I}(f) = \frac{1}{2\pi f \rho \Delta r} [Im(P_A(f)P_B^*(f))] \quad (2)$$

where $\rho$ is the density of air, $\Delta r$ is the separation between the microphone pair constituting the probe, $P_A(f)$ is a scalar pressure measured at microphone A after Fourier transforming the signal to a frequency spectrum, $P_B^*(f)$ is the complex conjugate of a similarly transformed measurement at microphone B and "Im" indicates that only the imaginary portion of the complex cross power spectrum given by $P_A(f)P_B^*(f)$ is considered in computing sound intensity. The sound intensity vector, in this form, is immediately derivable from a Fourier Transform (FT) of measurements taken at microphone A and microphone B of each probe; as all other contributions are taken to be constant for a given measurement.

The necessary prerequisite for implementing sound intensity as derived in equation (2) directly into the sound power calculation of equation (1), in a computationally straight forward manner, lies in gathering the pressure measurements from a sufficiently distributed plurality of probes enclosing the sound source over the same time interval.

Until now, conventional measurement techniques, like that disclosed in the above identified U.S. Pat. No. 4,532,807, have relied on scanning a measurement surface over various differing time intervals with a single probe rather than using a plurality of probes to collect measurements over the same time interval. This is because commercially available matched two microphone probes are quite expensive; ranging in cost from $5000 to $10,000 each. Such a precision microphone pair is generally carefully matched by physically modifying the probe itself, resulting in an expensive probe designed for a special purpose. It would be labor intensive and far too costly to attempt to delicately adjust a plurality of such costly probes to have identical gain and phase characteristics in this manner. Based on these limitations, single probe scanning is typically used to obtain a distributed plurality of measurements necessarily taken over varying time intervals which must then be averaged to estimate a spatial sound intensity distribution. Such distributions of pressure or sound intensity are depicted using contour maps to graphically identify localized sound sources as disclosed in the subject patent. This process is too slow for on-line product sound testing.

It is recognized that speed as well as effective background noise elimination can be obtained for on-line product sound testing by determining the total sound power emitted by a product directly according to equation (1). However, heretofore collecting measurements over the same time interval using a plurality of correlated probes has been unduly prohibitive. Providing such as useful plurality of measurements necessitates calibrating each microphone pair comprising each probe in the plurality in a simultaneous and practical way.

The present invention has for an object the elimination of the drawbacks mentioned above and provides a method and apparatus for rapidly determining the total sound power emitted by a source in an environment of background noise. The apparatus provides an effective noise elimination feature using a convenient, portable, multiprobe array equipped with inexpensive, rugged, replaceable, microphone pairs which can be easily calibrated for rapidly collecting a plurality of measurements over the same time interval in a substantially lossless acoustic environment.

SUMMARY OF THE INVENTION

The present invention is directed to a new and improved method and apparatus for measuring the sound emitted by a source in an environment of background noise. The sound is measured by an array of probes distributed over a virtual surface confronting the sound as emitted from the enclosed source. Each probe comprises a pair of low cost microphones carried in predetermined spaced relation by an elongated holder oriented substantially normal to the virtual surface. Based on the probe distribution in the array, each probe is assigned a portion of the virtual surface area.

Sound pressure is measured over the same predetermined time interval by each microphone of each probe of the array. The distributed measurements are either collected directly for immediate processing or multiplexed for sequential input and stored temporarily for delayed processing. The pressure measured at each microphone is digitally converted and Fourier transformed to the frequency domain. The cross-power spectrum is then computed for each microphone pair, i.e. each probe. Each cross-power spectrum is computationally corrected for any gain and phase mismatches in the probe microphones using predetermined calibration factors. The net sound intensity at each probe is calculated to determine the sound intensity vector flux flowing through the virtual surface at each probe location. Since sound intensity is a vector quantity, it is negatively or positively characterized with respect to the virtual surface, indicating whether the net sound measured at each probe was entering or leaving the surface. Sound power at each probe location is then determined by multiplying the calculated net sound intensity thereat by that portion of the virtual surface assigned to that probe. Total sound power emitted by the source is directly determined by summing the calculated sound powers for all of the probes. This summation approximates a closed surface integral of the total vector flux of sound intensity flowing through the virtual surface. This summation process over a closed virtual surface inherently averages out those contributions due to background noise to provide a numerical approximation of the total sound power emitted by the source alone.

BRIEF DESCRIPTION OF THE DRAWINGS

FIGS. 5(a)-5(c) illustrate the composite nature of the net sound intensity vector as determined at each probe.

DETAILED DESCRIPTION OF THE INVENTION

Figure 1:
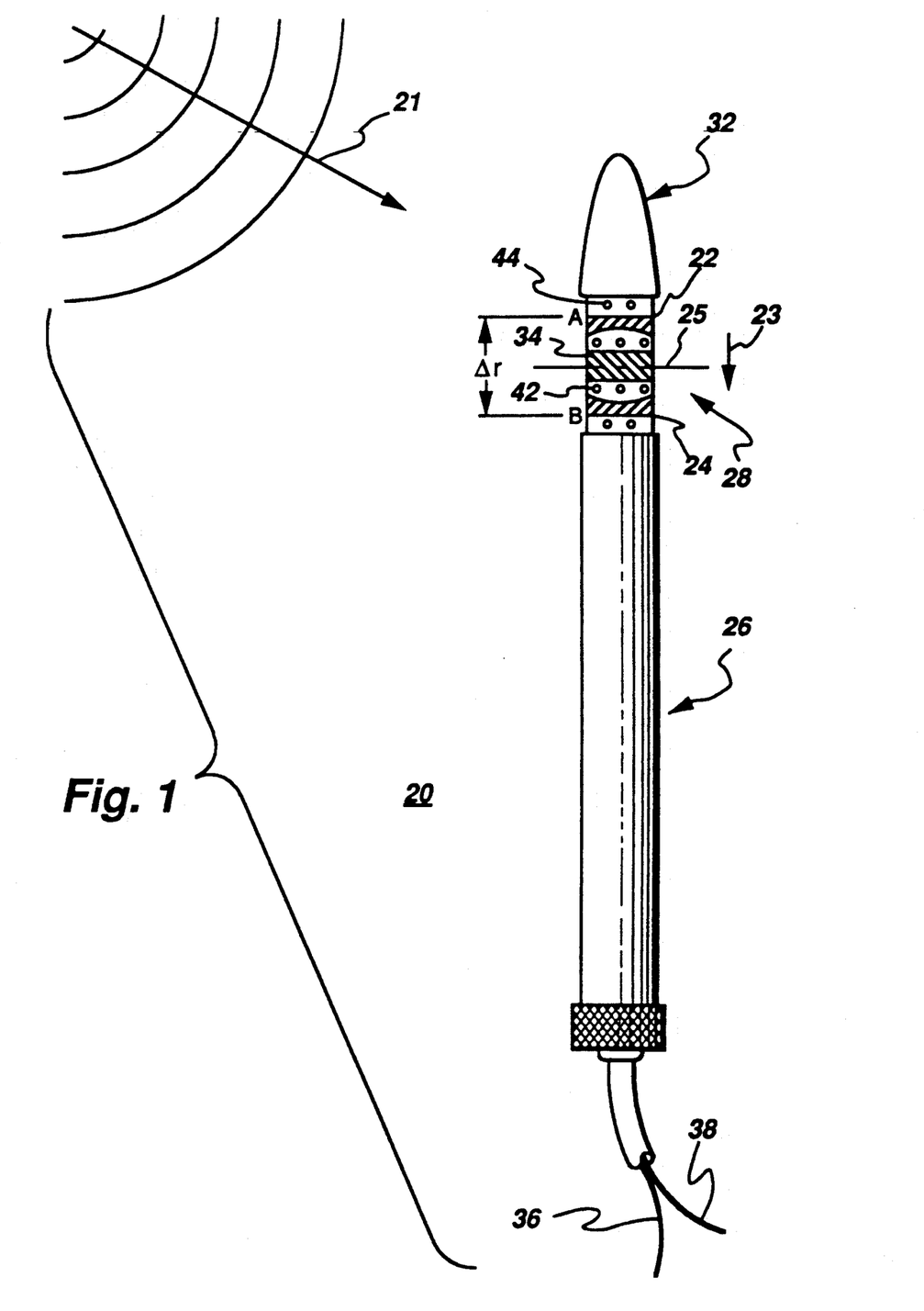
FIG. 1 is a side view of one of the plural sound detecting probes utilized in the present invention.

FIG. 1 depicts a preferred sound intensity probe 20 which comprises a pair of common commercially available condenser type microphones, 22(A) and 24(B), each generally unmatched in gain and phase response with respect to the other. The microphone pair is carried in predetermined spaced relation by an elongate member. The elongate member comprises a holder 26, a capsule 28 and a nose cone 32. The diaphragms of the microphone pair are mutually spaced a predetermined distance $\Delta r$ apart by a solid spacer, 34, and housed within the capsule portion 28 of the elongate member. The microphones and spacer can be selectively replaced to modify the frequency response character of the sound intensity probe. The holder, 26, houses connecting wiring and circuitry for driving and conditioning the electrical output signals 36 and 38 transduced from each microphone. Each microphone's electrical output signal 36, 38 is generated by electrically transducing the movement of a diaphragm vibrating in response to an instantaneous acoustic field pressure impinging on the diaphragm. The instantaneous acoustic field pressure is communicated in an undiminished and undistorted fashion via small inlet passages, 42, to the face of each diaphragm. Pressure behind each microphone diaphragm face is equalized to a static level via small inlet passages, 44, just behind each diaphragm, to further minimize risk of phase distortion. A nose cone, 32, is positioned at the tip of the elongate member just in front of the capsule. The nose cone 32 is designed to minimize acoustic scattering ensuring uniform flow of a symmetric acoustic field at the site of communication 42 to each respective diaphragm face.

A sound field propagating in an arbitrary direction indicated by arrow 21 impinges on the nose cone 32 of the probe causing the field to flow uniformly and symmetrically in the direction indicated by arrow 23. The sound field is communicated undistorted and undiminished to the diaphragms of microphones 22 and 24, causing them to vibrate. Signals 36 and 38 are generated proportional to the instantaneous acoustic pressure of the incident sound field presented to each microphone. These output signals constitute time dependent measurements of pressures at microphone positions 22 and 24, respectively. Note the vector sound intensity is calculated in terms of these measured pressures according to equation (2) at position 25 midway between the microphones, taken in the direction indicated by arrow 23.

Figure 2:
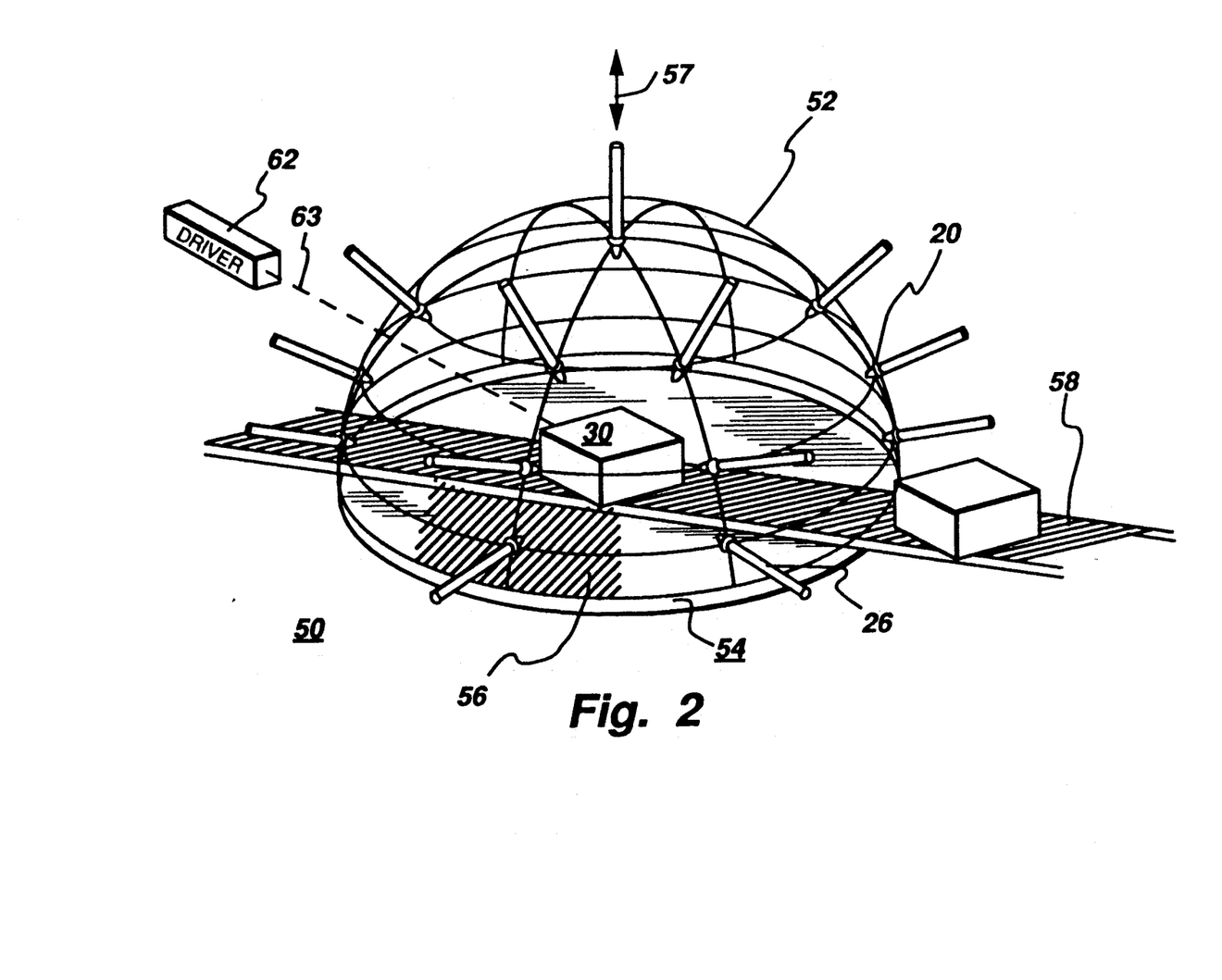
FIG. 2 is a schematic diagram of a plurality of the probes of FIG. 1 arrayed relative to a product for measuring the sound power emitted thereby while in a production environment.

In accordance with the present invention and as seen in FIG. 2, a plurality of probes 20 are distributed in an array 50 partially enclosing a source or product, 30 whose sound emission is to be measured. The measurement points of the array define a virtual surface 52 at position 25 of each probe as shown in FIG. 1. Cooperating with the virtual surface 52 to fully enclose the source is a rigid floor 54 which is made as acoustically reflective as possible. The number of probes required in a given array depends on the expected sound intensity distribution to be measured. Based on the geometry of the array and the relative position of each probe with respect to others in the array, each probe is assigned a respective portion 56 of the total virtual surface area. The holder portion of each probe 26 is aligned by the framework supporting the array in a direction substantially normal to the virtual surface 52. As will be seen, such alignment ensures that the ultimate sound power calculation is based on the vector component of sound intensity normal to the virtual surface, as only this normal component contributes to the scalar product calculation of net sound power at each probe. It should be noted that the array, and supporting framework, are not restricted to being hemispherical as shown in FIG. 2.

To conduct quality assurance sound emission testing on a production line basis, the framework may for example be lifted, as indicated by arrow 57, the product to be tested is indexed by suitable means, such as a conveyor 58, to an appropriate test position. The framework is then lowered back in place over the floor 54. Each product under test is then powered up using a suitable driver 62 to supply an electrical or mechanical input 63 appropriate for producing normal acoustic operation of the device as a sound source, 30.

The probe array 50 is comprised of a sufficient number of distributed probes each employing two unmatched microphones 22(A) and 24(B). Each probe 20 must be calibrated prior to testing. Gain and phase factors are independently determined for each probe microphone pair and stored for subsequent recall to linearly correct the sound power calculations of each probe and thereby correlate all measurements of the array. The compensating correction is applied at the time the test measurements are processed.

Related patent application Ser. No. 07/612,936 filed Nov. 4, 1990 describes and claims a preferred calibrator for calibrating each probe 20 of the present application. The preferred calibrator is designed to control and minimize distortion in the sound field presented to each microphone diaphragm during calibration. Thus during calibration, any phase difference measured between the two microphone signals is attributable to differences between the microphones themselves. This invariant phase difference can be corrected by an appropriately derived calibration factor. The calibrator is small, portable and capable of rapid, repeated, accurate on site wide-band calibration of any microphone pair selected to constitute a sound intensity probe. The calibrator is comprised of a common externally driven broad band loudspeaker element, an enclosed calibration chamber and a specially designed phase plug. The phase plug is uniquely designed and situated to selectively regulate the entry of sound pressure wavefronts generated by the loudspeaker into the calibration chamber. The phase plug cooperates with the wavelength of sound emanating from the diaphragm of the loudspeaker in such a way as to allow only sound waves in phase with one another, i.e. coherent sound waves, to pass into the calibration chamber in a time aligned manner. The shape and dimensions of the calibration chamber are designed to minimize distortion and create a spatially uniform sound field environment. The sound field within the calibration chamber is therefore, assured of being spatially and temporally uniform for calibration of the microphone pair constituting a sound intensity probe.

In operation, the method of calibration comprises inserting the probe through either of a pair of monitoring holes disposed opposite from one another on either end of the calibration chamber, so that both microphones of the probe are exposed to identical sound fields. Under such conditions the gain and phase difference between the microphone pair are calculated as follows:

To estimate gain, the probe and an standard reference microphone, which has been independently calibrated, are inserted into the calibration chamber. The loudspeaker exposes both to sound over a wide range of applied frequencies. Each output signal is input on a separate channel to a multichannel FFT spectrum analyzer. The FFT analyzer is used to adjust the channel sensitivities of each microphone of the probe pair to match that of the known reference microphone. After some averaging, this measurement then serves as the gain calibration for each microphone of the probe pair.

To estimate phase difference between the microphones the FFT spectrum analyzer is again used to measure the complex transfer function between the gain calibrated channels of the probe microphone pair. Assuming one microphone signal output to be the "input" to this transfer function and the other microphone signal output to be a corresponding "output"; an associated complex transfer function between the two can be evaluated. If gain calibration has been done correctly, the argument of this complex transfer function adequately approximates the phase difference between the microphone pair of the particular sound intensity probe.

Two values for gain, $g_A$ and $g_B$, one for each microphone of the probe, along with the phase difference, $\theta_i$ detected between the two microphones are computed for each microphone pair and compiled into a data base containing each microphone pair of interest. The data base of these calibration correction factors is stored on a suitable storage media and independently applied to correct each probe's cross spectrum as determined in the calculation of sound intensity measured by a particular probe. (See step 82 of FIG. 3). The calibration technique allows a plurality of such probes to be independently calibrated and the stored calibration factors independently applied to compensate for phase mismatch computationally. In this way, any microphone pair can serve as a suitable sound intensity probe as long as the appropriate calibration factor is available in the data base for phase compensating measurements taken therefrom.

Figure 3:
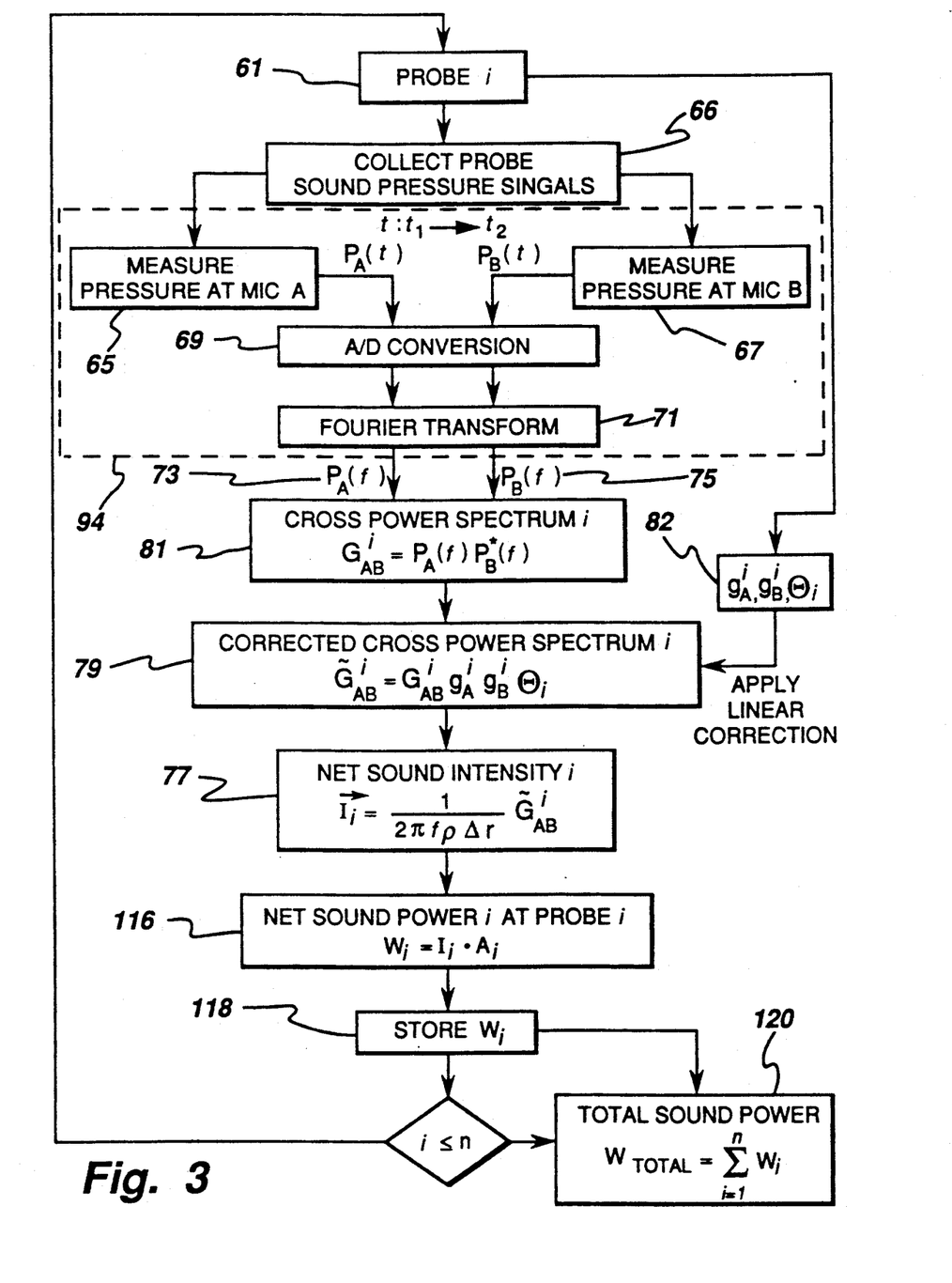
FIG. 3 is a flow chart illustrating the processing of sound pressure signals simultaneously collected from the probe array pursuant to calculating the total sound power emitted by the product.
Figure 4:
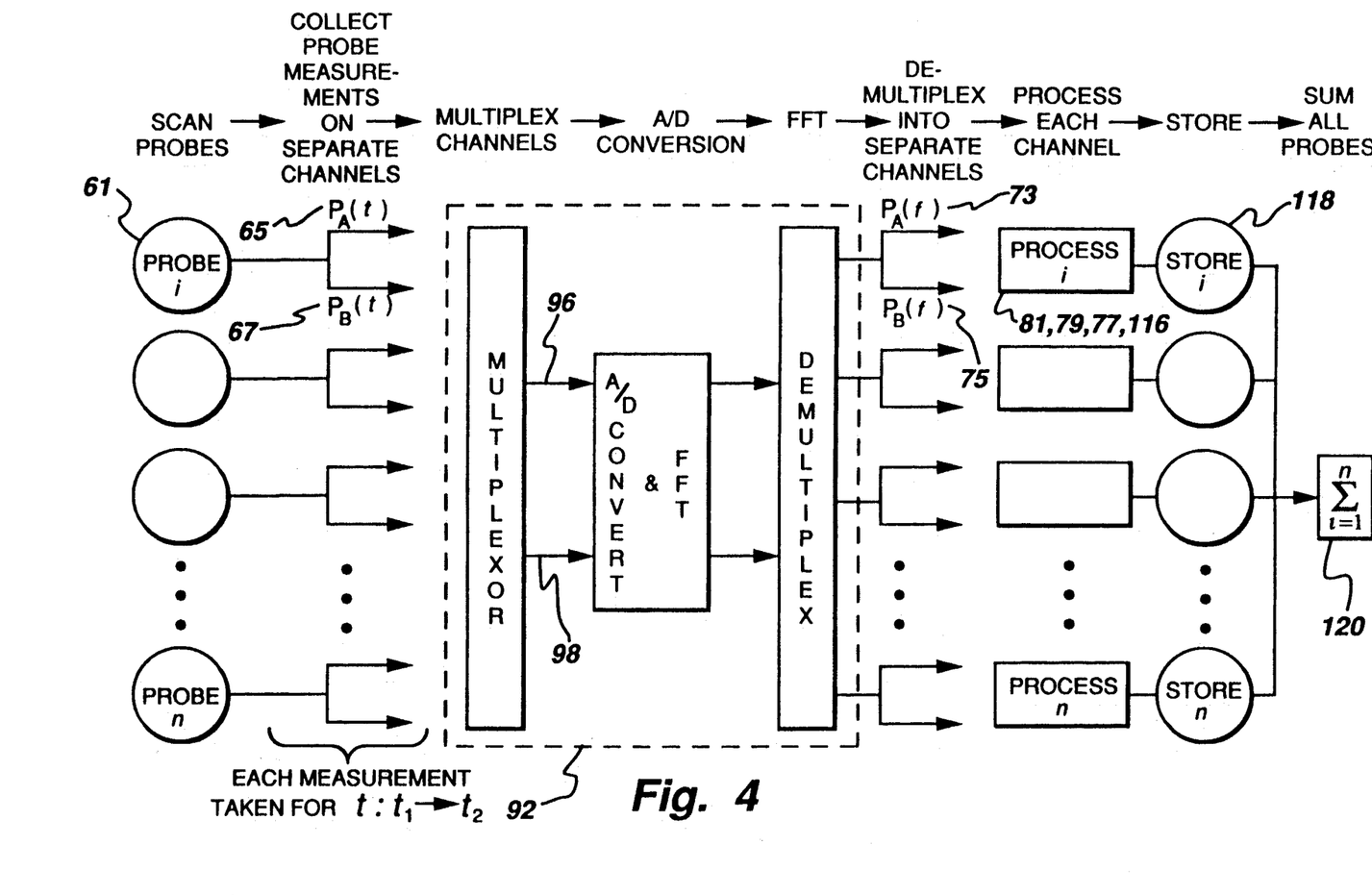
FIG. 4 illustrates multiplexing as a measurement collection alternative providing sequential input of pressure measurement signals for processing.

In operation the product under test is indexed to the probe array 50 to operate as a source of sound as shown in FIG. 2. Then, sound pressure measurements are collected from each microphone of each probe. Measurement collection proceeds either simultaneously as indicated in FIG. 3, or sequentially via a multiplexor as indicated in FIG. 4, over the same predetermined time interval, for each microphone pair. Simultaneous measurement collection and processing is preferable for speed and noise compensation considerations, but equipment limitations may impose a need for multiplexing.

After indexing the product to the probe array in step 61, each microphone pressure signal is collected as a function of time for each probe. These are indicated herein as $P_A(t)$ and $P_B(t)$ which are the outputs of steps 65 and 67, respectively in FIG. 3. Note, FIG. 3 illustrates the more straight forward simultaneous measurement and real time collection method. It can be seen that the dependent pressure measurements are converted from analog to digital signals at step 69 and Fourier transformed at step 71 for direct implementation as frequency spectrums, 73, 75 into a calculation of net sound intensity at each probe in step 77. The net sound intensity is calculated in terms of a corrected cross power spectrum as computed at step 79 from the uncorrected cross power of block 81. As microphones A and B are not matched, the cross power spectrum $P_A(f)P_B^*(f)$ must be corrected for each probe's gain and phase mismatches in step 79. This correction is applied computationally by recalling each probe's stored calibration factors from the independently stored data base in step 82.

Alternatively, a multiplexor can rapidly scan through the microphone pairs of the probe array and sequentially multiplex each measured pressure signal onto the number of available Fourier spectrum analyzer input channels. The Fourier spectrum analyzer typically performs analog to digital conversion and Fast Fourier transforms. The dashed portion of FIG. 4, indicated by numeral 92 accomplishes for the entire probe array that which is accomplished in the dashed portion of FIG. 3, indicated by numeral 94, for each and every probe of the array. Multiplexing is necessitated when the number of available input channels 96, 98 on the Fourier spectrum analyzer 101 is less than the total number of pressure measurement channels for the array herein taken to be 2n, where n is the number of probes in the array. The muliplexor scans the measurements collected over the same time interval for each probe; multiplexes these signals for input on the available number of Fourier spectrum analyzer channels 101; then demultiplexes the output into separate signals for computational processing by a computer or microprocessor.

Figure 5A:
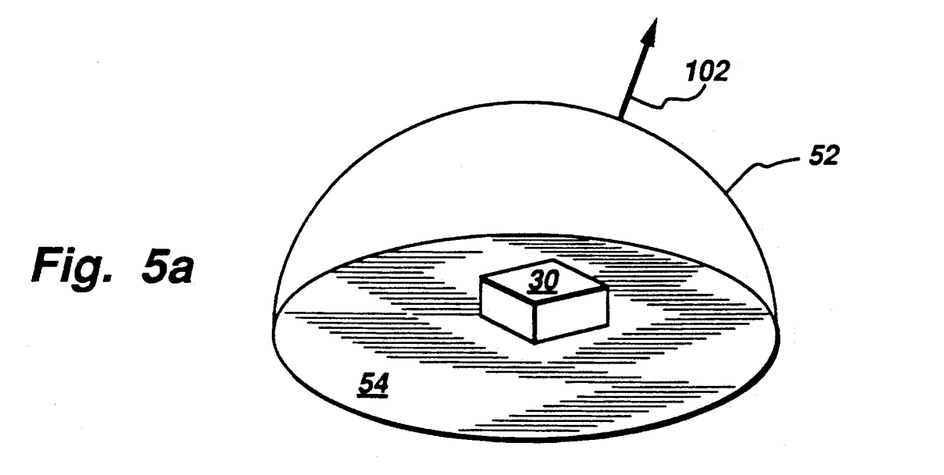

The physical significance of the net sound intensity vector as calculated for each probe according to equation (2) in step 77 of FIGS. 3 and 4 is illustrated in FIG. 5. FIG. 5 indicates the vector nature of the net sound intensity. The net sound intensity vector at each probe is comprised of a composite of contributions, each of which is negatively or positively signed with respect to virtual surface 52. FIG. 5(a) illustrates direct contributions 102 from source 30. FIG. 5(b) illustrates contributions from the background of ambient noise 104 which pass undiminished through the virtual surface 52. FIG. 5(c) illustrates reflective contributions, assuming that all reflections are nearly perfect. It is important to take notice that all component contributions are taken normal to the virtual surface as only normal components are relevant to the scalar product anticipated by equation (1). Due to the reflective floor and the lossless interior; all normal components entering the closed virtual surface also leave the closed virtual surface. The net effect upon summation over the measurement points of the distributed probe array is therefore to "average out" normal vector components of background noise over the entire virtual surface 52. Thus, component 106 cancels component 108 in FIG. 5(b), while component 110 when added to component 112 cancels component 114 in FIG. 5(c). Integration (or summation) over the entire virtual surface leaves only component 102 due to the source itself exclusive of background noise.

It can be seen in FIG. 5 that no flux of sound intensity vector can flow through the reflective floor, 54, so only the virtual surface defined by the probe array, A' as indicated by numeral 52, need be considered. As seen in FIG. 2, a respective portion, $A_i$, 56, of the applicable virtual surface A', 52 is assigned to each probe based on the probe distribution in the array. Therefore the total sound power integral is approximated from equation (1) as follows:

$$W = \oiint_A \vec{I} \cdot d\vec{A} = \oiint_{A'} \vec{I} \cdot d\vec{A} \approx \sum_{i=1}^{n} I_i A_i \quad (3)$$

where A is an arbitrary closed surface, and A' is the virtual surface defined by the probe array, such that $$\sum_{i=1}^{n} A_i = A' \quad (4)$$

where $A_i$ is that portion of the virtual surface A', assigned to probe i. $\vec{I}_i$ is the vector component of the net sound intensity normal to virtual surface, A' as computed at probe i. Calculation of this component is ensured as each probe of the array is oriented substantially normal to the virtual surface, A'.

FIGS. 3 and 4 indicates that after the net sound intensity at each probe $I_i$, is calculated in step 77, the net sound power at that probe is estimated by multiplying $I_i$ by that portion, $A_i$, of the virtual surface A' assigned to that probe in step 116. The net sound power calculated at each probe is retained in step 118, for summation over all n probes of the array in step 120. It is this summation process over the virtual surface of the probe array which "averages out" those normal contents of sound intensity due to background noise at said surface; retaining only the total sound power due to the enclosed source exclusive of background noise.

It will be appreciated that other types of well known probes, microphones and calibrators can be employed in the present invention. Thus, many other embodiments are possible within the spirit and scope of the present invention.

What is claimed is:

1. A method for measuring sound emitted by a source in an environment of background noise comprising the steps of:

providing a plurality of sound measuring probes, each one of the plurality of probes comprising at least a pair of microphones spaced a known distance apart on a common axis;

arranging the probes in a sufficiently distributed array about a virtual measurement surface so that the common axis of each probe is substantially normal to the virtual measurement surface;

indexing the source to an interior position confronting the virtual measurement surface;

collecting sound pressure measurements from each microphone of each one of the plurality of probes over a predetermined measurement interval;

converting the collected sound pressure measurements from each microphone to digital signals;

Fourier transforming said digital signals to a frequency domain;

calculating an average cross-power spectrum for the microphone pair of each probe;

computationally correcting the cross-power spectrum of each probe for mismatches in gain and phase of the microphones thereof from stored probe calibration correction factors;

calculating a net sound intensity at each probe from the corrected cross-power spectrum thereof; and performing a closed surface integration of the net sound intensities at all probes over the virtual measurement surface to determine total sound power emitted by said source exclusive of any background noise.

2. The method in accordance with claim 1 wherein the step of collecting sound pressure measurements is performed simultaneously with respect to the plural probes.

3. A method in accordance with claim 1 wherein the step of collecting sound pressure measurements is performed sequentially with respect to the plural probes using a multiplexor.

4. Apparatus for measuring sound emitted by a source in an environment of background noise comprising:

a plurality of measurement probes, each one of said plurality of probes comprising at least two microphones carried by an elongate member in spaced relation, said probes being distributed in an array over a virtual measurement surface with said elongated members oriented substantially normal to said surface;

means for collecting sound pressure measurements from each microphone of each probe;

means for converting said sound pressure measurements to digital signals;

means for Fourier transforming said digital signals to a frequency domain;

means for determining an average cross-over spectrum for said microphones of each said probe;

means for applying stored probe calibration correction factors to said average cross-power spectrum determined for each said probe;

means for calculating a net sound intensity at each probe;

means for summing over all of said probes a multiplicative product of net sound intensity determined at each said probe with said probe's assigned portion of the virtual measurement surface to determine a total sound power emitted by the source exclusive of any background noise.

5. Apparatus in accordance with claim 4 wherein the means for collecting sound pressure measurements further includes an input channel for each measurement.

6. Apparatus in accordance with claim 4 wherein the means for collecting sound pressure measurement further includes a multiplexor to scan said measurements for sequential input over an available number of input channels.

7. Apparatus in accordance with claim 4 wherein only sound pressure measurements within a useful frequency range of the probes are retained for calculation.

8. Apparatus in accordance with claim 4 wherein the virtual measurement surface is closed with respect to a vector flux of sound intensity flowing through said surface.

* * * * *